United States Patent [19]

Pranzo

[11] Patent Number: 5,065,077
[45] Date of Patent: Nov. 12, 1991

[54] COLOR MONITOR

[76] Inventor: Salvatore Pranzo, Via Campeggi 15, 27100 Pavia, Italy

[21] Appl. No.: 555,876

[22] Filed: Jul. 23, 1990

[30] Foreign Application Priority Data

Jul. 31, 1989 [IT] Italy ................. 21390 A/89

[51] Int. Cl.[5] .................. G09G 1/04; H01J 29/80; H04N 9/27
[52] U.S. Cl. ................... 315/375; 315/409; 358/72
[58] Field of Search .......... 315/375, 383, 409, 410; 358/66, 72

[56] References Cited

U.S. PATENT DOCUMENTS

| | | |
|---|---|---|
| 3,522,369 | 7/1970 | Robert et al. |
| 3,697,880 | 10/1972 | Melchior et al. |
| 4,450,387 | 5/1984 | Reed et al. ............ 315/375 |
| 4,660,076 | 4/1987 | Knapp et al. ........... 315/375 |

FOREIGN PATENT DOCUMENTS 2056797 11/1970 Fed. Rep. of Germany.

OTHER PUBLICATIONS

"Mehrfarben-Elektronenstrahl Röhren", by W. Zwingers Internationale Elektronischerundschau, No. 5, 1968, pp. 113-114.

*Primary Examiner*—Gregory C. Issing
*Attorney, Agent, or Firm*—Guido Modiano; Albert Josif

[57] ABSTRACT

The color monitor has a cathode-ray tube adapted to generate a single electron beam with different energy levels depending on the primary color to be displayed on a screen which has at least one layer of electroluminescent material, and a control circuit for the sequential display of the primary colors. The cathode-ray tube defines a capacitor charged to voltages which differ in value according to the color to be displayed. Generators are provided which are adapted to generate an overcurrent in the capacitor and to cause its rapid discharge at the end of the display of the color signal with higher energy.

6 Claims, 1 Drawing Sheet

COLOR MONITOR

BACKGROUND OF THE INVENTION

The present invention relates to an improved color monitor, and in particular to a color monitor for displaying images and/or texts in a plurality of colors.

As known, the use of color monitors connected to numeric devices, such as computers, for the display of images or texts in a plurality of colors is currently becoming widespread.

In particular, color monitors are currently commercially available which are constituted by a single cathode-ray tube which is capable of generating a single electron beam with different energy levels so as to excite in a differentiated manner a screen coated with electroluminescent material which therefore emits polychromatic light.

A color monitor of this type is described for example in the Italian patent application 19217A/87, filed on Jan. 30, 1987 in the name of the same Applicant. In particular, said known monitor comprises a circuit for controlling the cathode-ray tube which receives in input electric color signals which are appropriately encoded and represent the primary colors to be visualized on the screen, and modifies the level of energization of the electron beam at the end of each complete scan of the screen so as to separately display in succession the primary colors which constitute the images to be shown.

By virtue of the phenomenon of retention on a part of the retina and to the persistence of the light emission of the electroluminescent material, even if the primary colors are emitted at different times they are seen by the human eye as if they were emitted simultaneously, thus allowing the visualization of many or all colors using only two or three primary colors.

In this kind of monitor, amplifier means are thus provided which are capable of adapting the anode current or anode voltage according to the color to be displayed in each instance, thus modifying the energy of the generated electron beam according to the color to be visualized in that instant.

At the end of each scan of the screen, therefore, the anode voltage must be increased or decreased to visualize the subsequent color. This variation must be performed during the electron beam flyback time in order to correctly display the colors of the image being shown. Whereas the anode voltage increase does not entail substantial problems, the adaptation of the energy of the electron beam in changing from a higher energy level to a lower one is instead more troublesome. The anode (connected to the high voltage) is in fact formed by an aluminized layer or by a coating of another conducting material inside the glass bulb which forms the electron gun and is externally surrounded by a layer of graphite connected to the ground. The anode and the graphite therefore form the two plates of a capacitor, the dielectric whereof is constituted by the glass of the bulb. The capacitor must be discharged in passing from a higher voltage level to a lower one within the flyback time of the electron beam.

The discharge of the capacitor therefore constitutes a problem for the correct operation of the monitor which has been dealt with in various manners. For example, it is possible to provide a resistor which is connected in parallel to the capacitor to allow its discharge. Since this solution requires a longer time for discharge, the color change command is issued with a delay with respect to synchronization; if this delay is chosen equal to at least 180°, in practice it entails an advance of the color change instant. In practice the discharge of the capacitor can start immediately after the end of the scan of the screen, without waiting for the synchronization signal, thus allowing the correct operation of the monitor.

Though this solution is very advantageous, since it solves the above described problem with very simple and economical means, it is however susceptible to improvement, in particular in order to increase the capacitor discharge speed.

SUMMARY OF THE INVENTION

Given this situation, the aim of the present invention is to improve the color monitor described in the above mentioned patent application so as to ensure a rapid discharge of the capacitor formed by the anode of the electron gun.

Within the scope of this aim, a particular object of the present invention is to provide a color monitor which operates reliably and safely.

Another object of the present invention is to provide a monitor of the indicated type which has economical capacitor discharge means which do not entail substantial modifications of the remaining circuits of said monitor and of the structure of the cathode-ray tube.

This aim, these objects and others which will become apparent hereinafter are achieved by an improved color monitor for the display of images and/or texts in a plurality of colors, as defined in the appended claims.

BRIEF DESCRIPTION OF THE DRAWINGS

The characteristics and advantages of the invention will become apparent from the description of a preferred embodiment, illustrated only by way of non-limitative example in the accompanying drawings, wherein.

DESCRIPTION OF THE PREFERRED EMBODIMENTS

Figure 1:
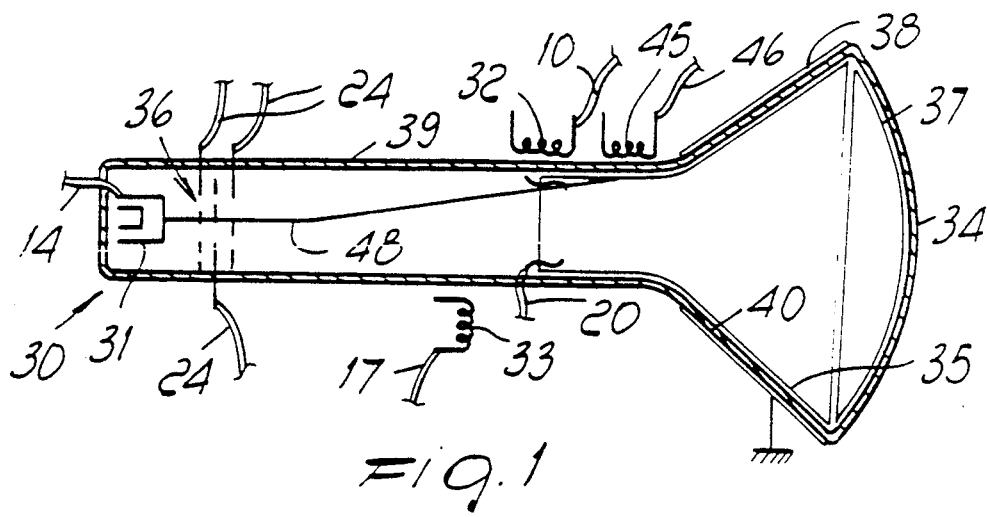
FIG. 1 is a simplified transverse sectional view of the cathode-ray tube used.

With reference to FIG. 1, the figure illustrates a transverse cross section of the cathode-ray tube of the monitor according to the present invention. In particular, the cathode-ray tube has been indicated by the reference numeral 30 and comprises a cylindrical portion 39 and a bulb 40, which frontally defines a screen 34; the cathode-ray tube 30 and its components are made of glass. A cathode 31, adapted to emit the electron beam and powered by means of a line 14, focusing grids 36, powered by means of the lines 24, a vertical scanning yoke 32, connected to a line 10, and a horizontal deflection coil 33, connected to a line 17, are inserted inside the glass tube, in the cylindrical portion 39. A conducting layer, provided for example by aluminization, is deposited inside the bulb 40 except for the screen 34, defines an anode 35 and extends partially inside the cylindrical portion 39, whereas an electroluminescent layer 37 (for example P51 phosphorus) adapted to emit light at different frequencies (and therefore with different colors) depending on the excitation energy of the electron beam (penetration screen), is provided inside the screen 34. The outer side of the bulb 40, except for the screen 34, is covered by a layer of graphite 38 which is connected to ground. The conical surface of the bulb 40 of the cathode-ray tube 30 therefore defines a capacitor which has the anode 35 (biased at a high voltage, typically between 10 and 17 KV) as an internal plate, the glass of the bulb 40 itself as a dielectric and the graphite coating 38 as an external plate. The capacitor must therefore be discharged in order to reduce the anode voltage at the end of a scan of the screen 34, in passing from the display of a color at higher energy to one with lower energy.

According to the invention, in order to achieve a faster discharge of the capacitor, the electron beam generated by the cathode 31 is accelerated and deflected so as to strike against the anode 35, and precisely in such a point as to not be visible from the outside, and is energized so as to rapidly discharge the capacitor. This effect is obtained by causing a greater deflection of the electron beam (i.e. by generating an auxiliary magnetic field which overlaps the one for controlling vertical deflection) on one hand, and by modifying the voltage applied between the cathode 31, the anode 35 and the focusing grids 36 on the other hand, so as to bring the electron gun to a saturation condition (in practice the valve constituted by the cathode-ray tube is brought to a condition of maximum conduction).

The greater deflection of the electron beam (so that the discharge is not displayed on the screen) can be generated for example by providing a further vertical control coil, indicated by the reference numeral 45 in FIG. 1, and powered by means of a line 46 in appropriate times, or by operating on the flyback of the vertical deflection signal so that it causes an extra deflection of the electronic beam in addition to its normal flyback.

The rapid discharge of the capacitor is instead obtained by modifying the energy level of the cathode 31 and/or of the control grids 36 when the capacitor is to be discharged. For example, the cathode 31, which is normally biased at 30–80 Volt, can now be brought to 0 Volt; the first grid 36, which is normally biased between −50 and +50 Volt, can be biased at 100 Volt. In general, the supply of current to the anode 35, which indeed is to be reduced in passing from the color with higher energy to the color with lower energy, is suspended.

Figure 2:
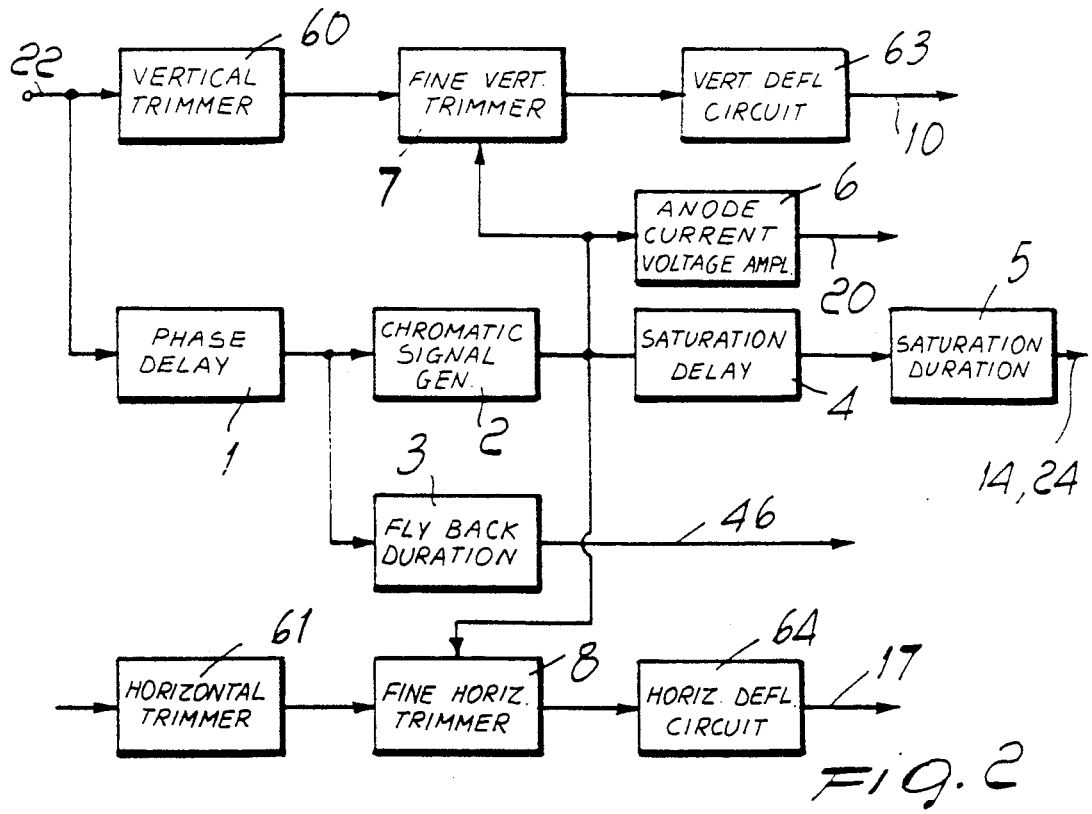
FIG. 2 is a general block diagram of the control section of the monitor according to the invention.
Figure 3A:
FIGS. 3a–3d plot the behavior of some signals sampled at appropriate points of the diagram of FIG. 2.
Figure 3B:

The cathode-ray tube control circuit is illustrated in FIG. 2. In detail, the circuit comprises a phase delay section 1, which receives in input the vertical synchronization signal fed on the terminal 22. This section has the purpose of delaying the active front of the synchronization signal (shown in FIG. 3a, whereas FIG. 3b illustrates the delayed signal generated by the section 1). The delay generated by the section 1 is chosen so as to coincide with the end of the useful signal to be shown on the screen (this signal in fact has a shorter duration than the time interval between two vertical synchronization pulses). In practice, this delay is chosen greater than 180° and therefore is an advance on the subsequent vertical synchronization signal. The section 1 is connected in output to a chromatic signal generator 2 and to a flyback duration control circuit 3.

Figure 3C:

The generator 2 has the function of generating an output which changes state at every active front of the delayed signal fed by the section 1. In practice, the generator 2 is constituted by a divider which generates a signal at a frequency which is a submultiple of the vertical synchronization frequency. In the case of two primary colors, the divider is a divider by two and generates the signal shown in FIG. 3c. This signal (color signal) changes at the end of the display of each page and is used to control the other circuits of the monitor so that they assume the optimum operating conditions for the color to be displayed in the half-period related to that color.

Figure 3D:

The color signal is then also sent to a saturation delay circuit 4 which drives a saturation duration control circuit 5. The circuits 4 and 5 respectively comprise a monostable or timer so as to generate the signal shown in FIG. 3d, delayed in time with respect to the color signal and having an appropriate duration. The output of the circuit 5 is sent to the circuits which drive the cathode 31 and/or grids 36, so as to force the saturation of the cathode-ray tube 30 and the high absorption which causes the discharge of the capacitor. In practice, these circuits 4,5, depending on the active front of the color signal, which indicates the beginning of the half-period related to the color to be displayed (for example red), generate a pulse which is delayed so as to actuate the discharge of the capacitor at the end of the flyback or return step of the electron beam (i.e. when said beam, indicated by the numeral 48, is in the position shown in FIG. 1).

The color or chromatic signal generated by the section 2 is furthermore fed to an anode overvoltage/overcurrent amplifier 6, which has the function of generating the high voltage related to the color to be displayed, and to fine adjustment vertical and horizontal trimmers 7 and 8 which are explained hereinafter.

The output of the delay section 1 is furthermore fed to the flyback duration control circuit 3. The circuit 3, which can be provided by means of a timer, has the purpose of generating a pulse for controlling the flyback of the electron beam 48 at the end of the visualization of each color. The circuit 3 therefore controls the rapid flyback of the electron beam 48 in the appropriate time by means of the coil 45. In this manner, when the circuits 4, 5 generate the saturation signal the electron beam 48 is in such a position as to not disturb any operators and/or observers operating in front of the screen 34.

The monitor according to the invention is furthermore completed by a vertical trimmer 60 which, by shifting the phase of the vertical signal, allows to trim the position of the image on the screen. Similarly, the trimmer 61 allows the electronic adjustment of the horizontal position. These trimmers 60, 61, analogous to similar ones provided in monitors of other kinds, both monochrome and color, have the advantage of allowing the adjustment of position without intervening on mechanical parts (yoke inclination) or magnetic ones (centering magnets).

The fine adjustment vertical and horizontal trimmers 7 and 8 instead of operating on the image as a whole can also operate on a single plane of the image which represents the component part constituted by a single primary color. The fine adjustment trimmers 7 and 8 respectively control vertical and horizontal deflection circuits 63, 64 which feed lines 10 and 17.

As can be seen from the above description, the invention fully achieves the intended aim and objects. A color monitor has in fact been provided which, by virtue of the saturation of the cathode-ray tube 30, allows a rapid discharge of the capacitor formed by the anode 35 with simple means, so that the monitor according to the invention has low production costs. The monitor according to the invention furthermore does not require modification of the signals arriving from the computer or generator of the images or pages to be displayed and operates reliably.

The invention thus conceived is susceptible to numerous modifications and variations, all of which are within the scope of the inventive concept. In particular, the fact is stressed that though the control for the flyback of the electron beam in the required time and manner has been provided, in the illustrated embodiment, by means of a separate coil 45, arranged flanking the conventional vertical scanning yoke 32 which handles the vertical deflection of the beam 48 in the useful part of the screen 34, it is possible to use the commonly provided vertical scanning yoke 32 itself. In this case the circuit 3 can be included in the vertical deflection amplifier 63, forcing it in practice to produce an increase in the flyback with respect to the value merely necessary to obtain the flyback of the electron beam 48. Otherwise the circuit 3 can co-operate with a driver of its own to the control of the vertical scanning yoke 32.

The delay times are chosen according to the requirements and can be generated by a single stage if they coincide.

All the details may furthermore be replaced with other technically equivalent ones.

I claim:

1. Improved color monitor, comprising a cathode-ray tube for generating a single electron beam with different energy levels depending on the primary color to be displayed and a screen which has at least one layer of electroluminescent material, and a control circuit for controlling the sequential display of said primary colors, said cathode-ray tube further including a cathode, a grid, a cylindrical portion, a bulb which frontally defines said screen, a conducting layer inside the bulb defining an anode and a graphite layer outside said bulb, said anode and said graphite layer defining therebetween a capacitor charged to voltages which differ in value according to the color to be displayed, wherein it comprises means adapted to vary the energy level between the cathode and the grid of said cathode-ray tube so as to generate an overcurrent in said capacitor and to cause its rapid discharge at the end of the display of the color signal with higher energy.

2. Monitor according to claim 1, wherein said means for generating the overcurrent comprise generators adapted to vary the voltage applied to the cathode and/or to the grids of the cathode-ray tube.

3. Monitor according to claim 1, further comprising means adapted to increase the deflection of the electron beam before and/or after flyback to the beginning of a new half-period in such a way as to cause said electron beam to strike the anode in a position which is not visible on the screen of the cathode-ray tube.

4. Monitor according to claim 1, wherein said control circuit comprises a phase delay section having an input said phase delay section receiving at said input, the vertical synchronization pulses and being adapted to generate a delayed phase signal which has a delay substantially corresponding to the length of the useful signal, a circuit for controlling the duration of the flyback of the electron beam connected to said delayed phase signal and adapted to actuate the rapid flyback of the electron beam at the end of a complete scan of the screen, a color signal generator adapted to generate a signal which encodes the color signal to be displayed, a saturation control circuit adapted to control the generation of the overcurrent in the capacitor at the end of the flyback of the electron beam, said color signal generator being furthermore connected to a high anode voltage generator.

5. Improved color monitor, comprising:
a cathode-ray tube for generating a single electron beam with different energy levels depending on the primary color to be displayed, said cathode-ray tube including a cathode, a cylindrical portion, a bulb which frontally defines a screen, a conducting layer inside the bulb defining an anode and a graphite layer outside said bulb, said anode and said graphite layer defining therebetween a capacitor charged to voltages which differ in value according to the color to be displayed;
at least one layer of electroluminescent material at said screen;
a control circuit for controlling the sequential display of said primary colors;
means adapted to vary the voltage applied to the cathode and/or the grid of said cathode-ray tube so as to generate an overcurrent in said capacitor and to cause its rapid discharge at the end of the display of the color signal with higher energy; and
means adapted to increase the deflection of the electron beam before and/or after flyback to the beginning of a new half-period in such a way as to cause said electron beam to strike the anode in a position which is not visible on said screen of said cathode-ray tube.

6. Improved color monitor, comprising:
a cathode-ray tube for generating a single electron beam with different energy levels depending on the primary color to be displayed, said cathode-ray tube including a cathode, a cylindrical portion, a bulb which frontally defines a screen, a conducting layer inside the bulb defining an anode and a graphite layer outside said bulb, said anode and said graphite layer defining therebetween a capacitor charged to voltages which differ in value according to the color to be displayed;
at least one layer of electroluminescent material at said screen;
a control circuit for controlling the sequential display of said primary colors, said control circuit including: a phase delay section having an input, said phase delay section receiving at said input vertical synchronization pulses and being adapted to generate a delayed phase signal which has a delay substantially corresponding to the length of the useful signal, a circuit for controlling the duration of the flyback of the electron beam connected to said delayed phase signal and adapted to actuate the rapid flyback of the electron beam at the end of a complete scan of the screen, a color signal generator adapted to generate a signal which encodes the color signal to be displayed, and a high anode voltage generator connected to said color signal generator; and
means adapted to vary the voltage applied to the cathode and/or the grid of said cathode-ray tube so as to generate an overcurrent in said capacitor and to cause its rapid discharge at the end of the display of the color signal with higher energy, wherein said means includes a saturation control circuit adapted to control the generation of the overcurrent in the capacitor at the end of the flyback of the electron beam.

* * * * *